United States Patent [19]
McRobert

[11] 3,961,469
[45] June 8, 1976

[54] ROTARY WINDROWING MACHINE

[75] Inventor: Leon R. McRobert, Ocoee, Fla.

[73] Assignee: FMC Corporation, San Jose,, Calif.

[22] Filed: Aug. 26, 1974

[21] Appl. No.: 500,238

[52] U.S. Cl. .................................. 56/328 R; 15/82
[51] Int. Cl.² .............................................. A01D 51/00
[58] Field of Search ............. 56/328 R, 327 R, 370,
56/377, 6, 28; 214/350–359, 522; 15/82, 87

[56] References Cited
UNITED STATES PATENTS

| | | | |
|---|---|---|---|
| 1,600,836 | 9/1926 | Manson | 56/94 |
| 2,683,345 | 7/1954 | Meyer | 56/377 |
| 2,929,187 | 3/1960 | Boggio | 56/11.9 |
| 3,066,745 | 12/1962 | Smith et al. | 172/118 |
| 3,190,364 | 6/1965 | Maloney | 172/111 |
| 3,415,043 | 12/1968 | Shones | 56/13.6 |
| 3,416,296 | 12/1968 | Culp | 56/28 |
| 3,426,515 | 2/1969 | Boyer | 56/327 R |
| 3,509,707 | 5/1970 | Stampfer | 56/370 |
| 3,667,200 | 6/1972 | Pool et al. | 56/328 R |
| 3,762,140 | 10/1973 | Block | 56/328 R |
| 3,863,430 | 2/1975 | Jennings | 56/328 R |
| 3,893,286 | 7/1975 | Buttram | 56/328 R |

*Primary Examiner*—Russell R. Kinsey
*Attorney, Agent, or Firm*—A. J. Moore; C. E. Tripp

[57] ABSTRACT

A windrowing machine for moving rollable articles such as citrus fruit transversely into a windrow. The machine includes a mobile chassis that is moved parallel to rows of trees and includes a pair of generally horizontal wings movable between a stowed position parallel to the path of movement of the vehicle and a plurality of windrowing positions projecting transversely outward of the chassis to accommodate different tree row spacings. A plurality of full floating, generally horizontal windrowing wheel and tire assemblies are pivotally supported by the wings and are driven through universal joint connections to follow the contour of the ground while moving the articles progressively inward from the outermost wheel to the innermost wheel to form the articles into a windrow. At least one driven windrowing brush is pivotally mounted on the outer end of each wing in position to remove the articles from the tree row centerline and direct them inwardly for acceptance by the wheel and tire assemblies.

20 Claims, 20 Drawing Figures

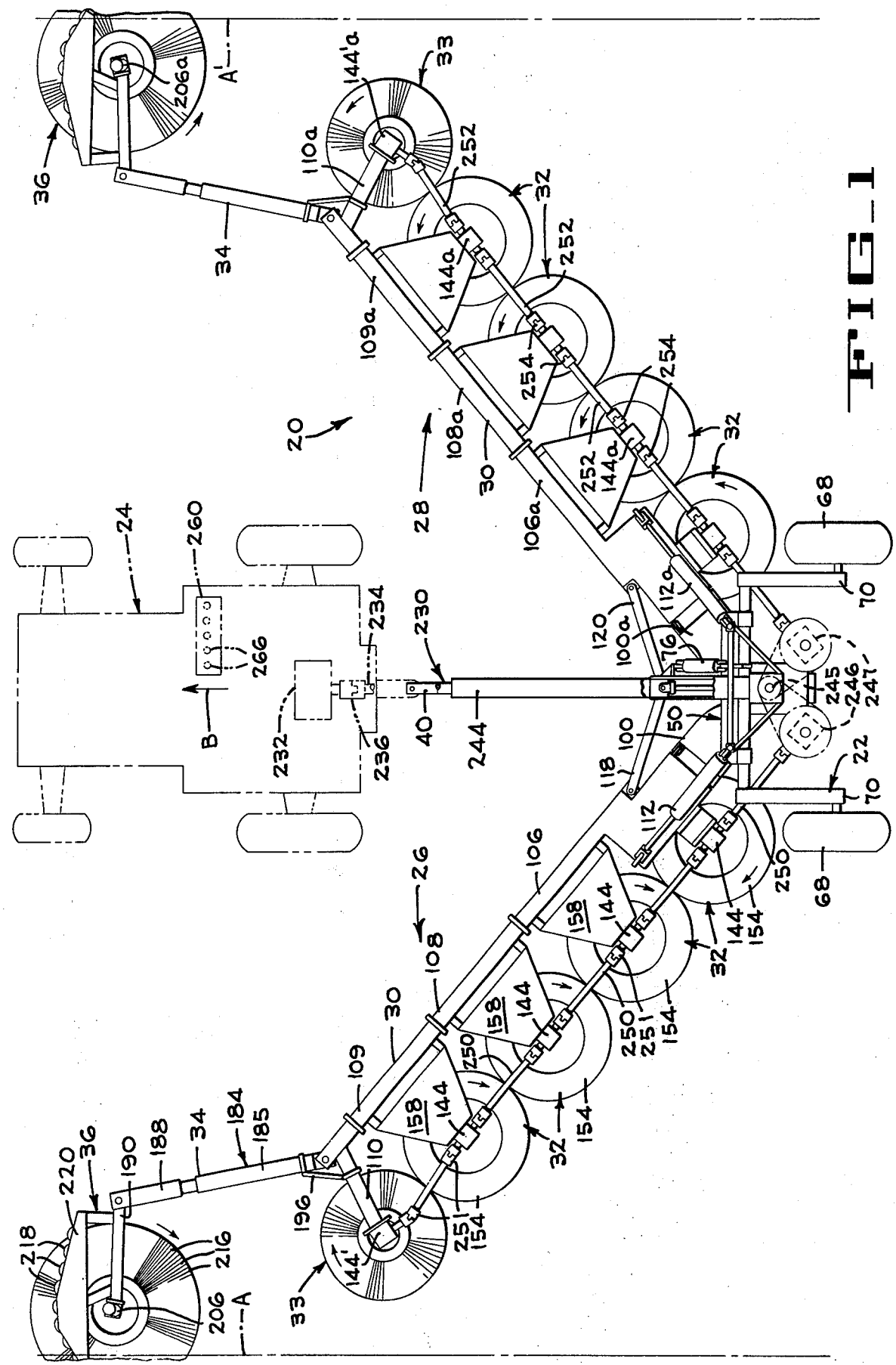
FIG_1

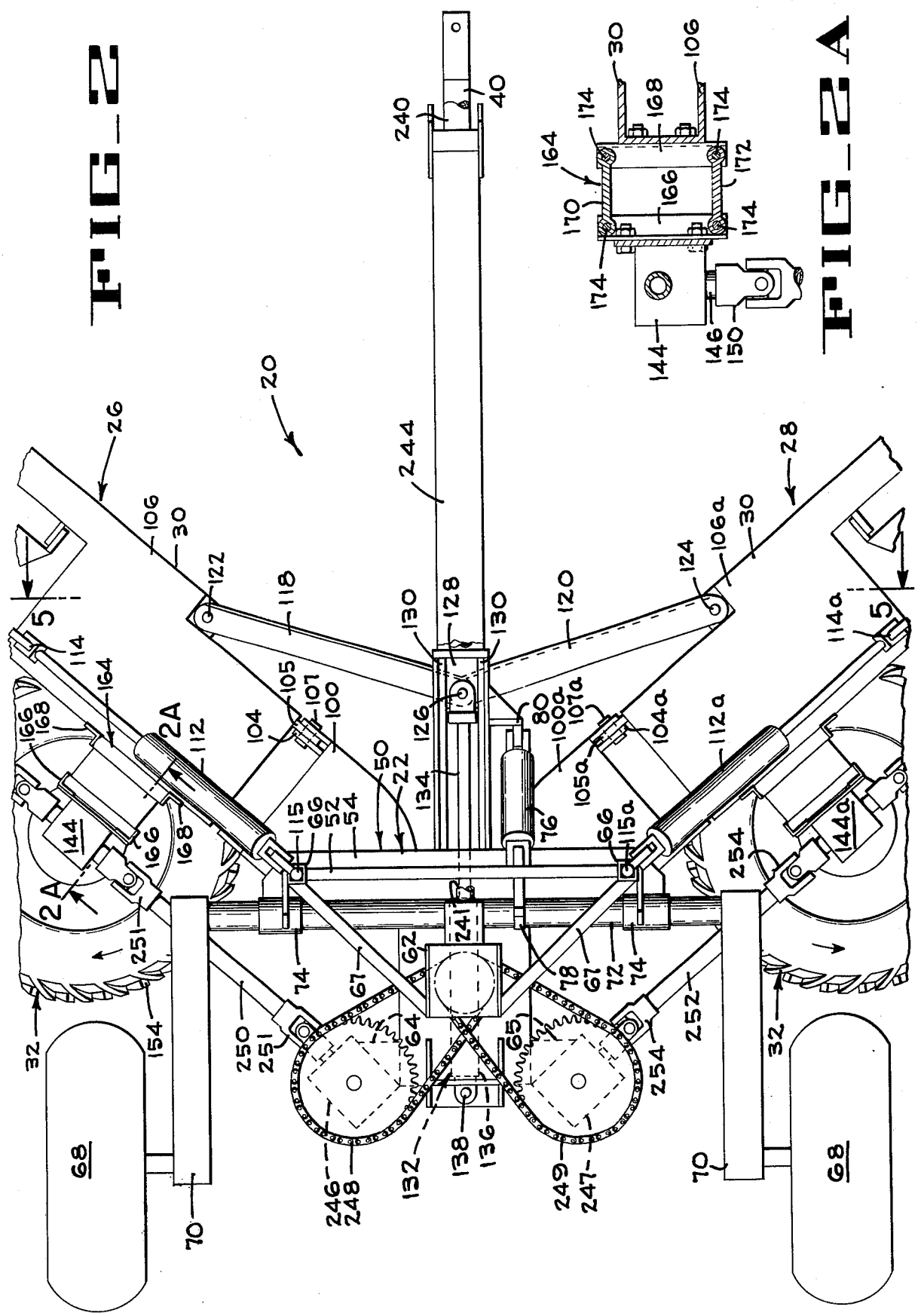

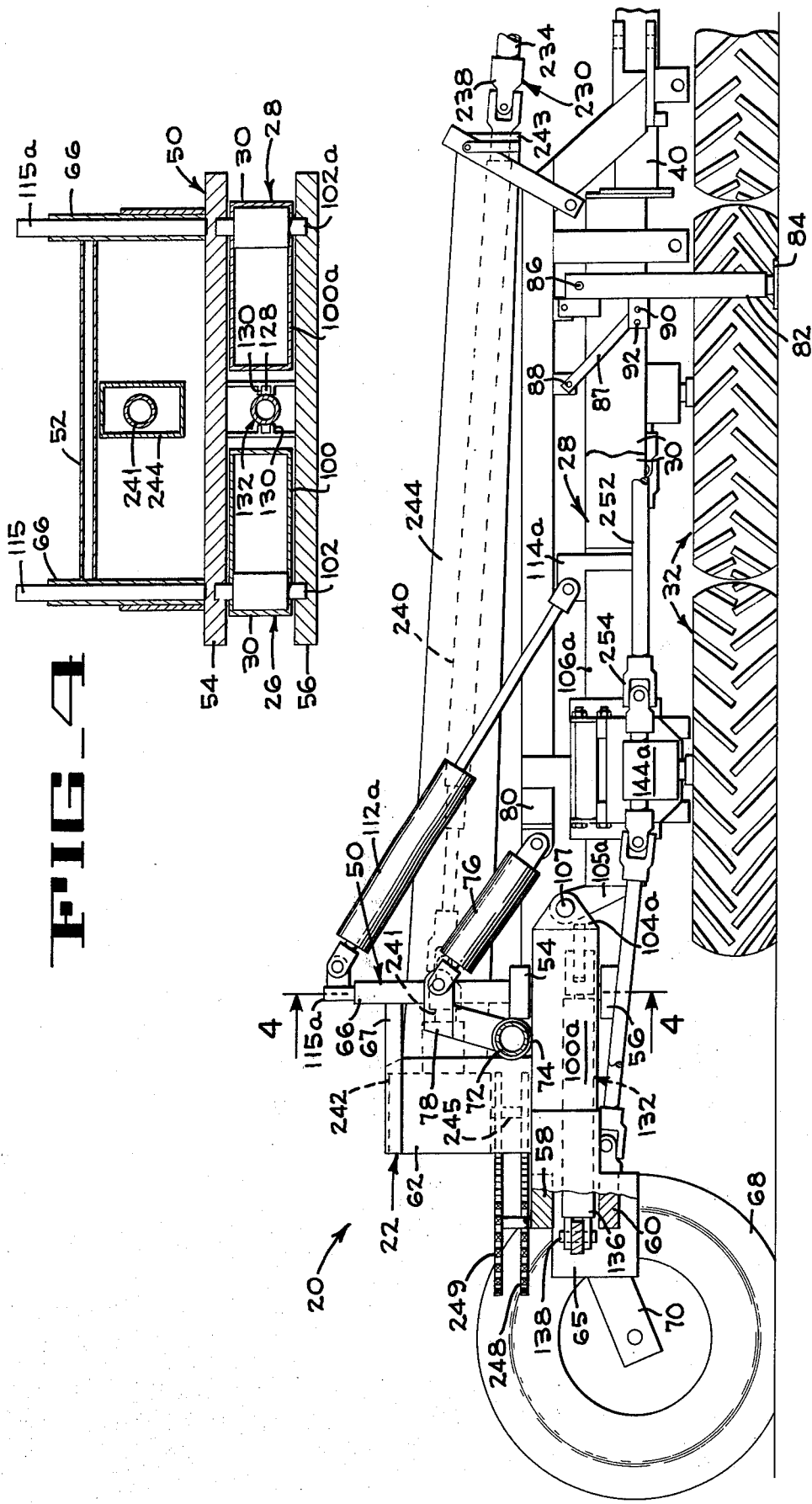

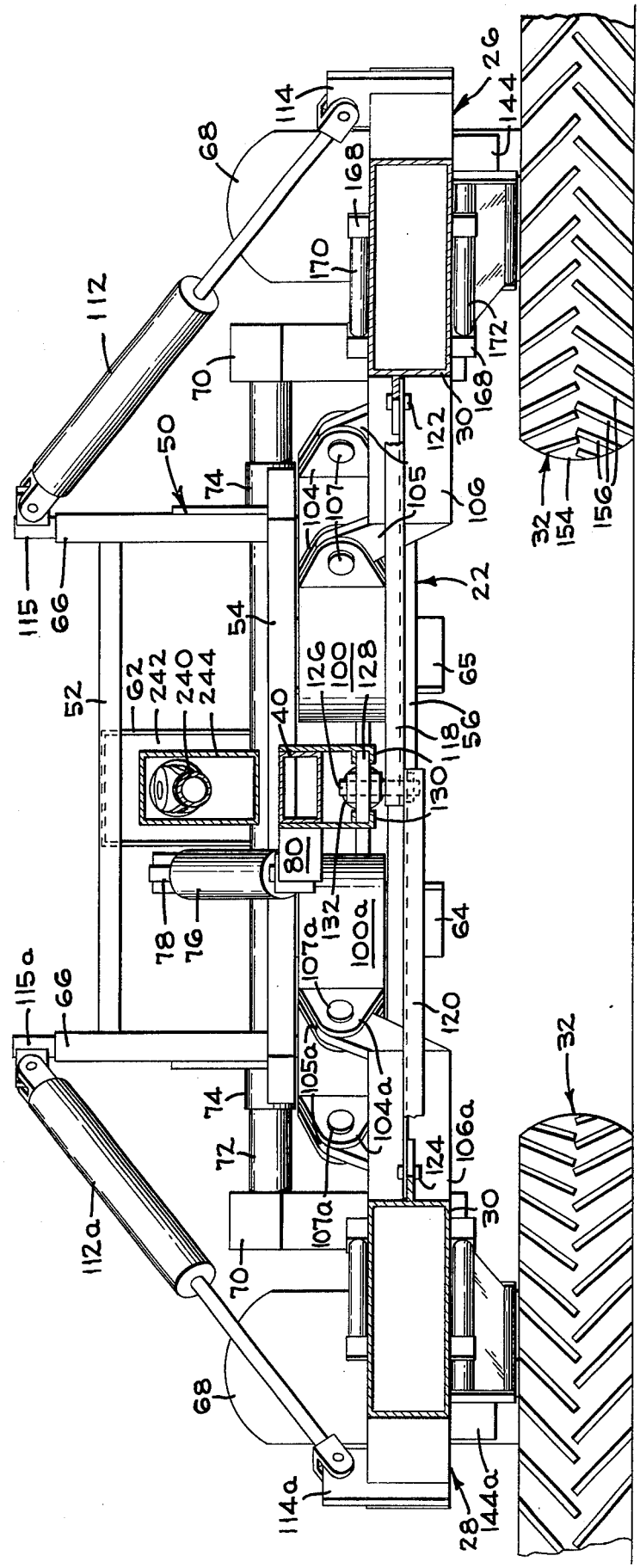

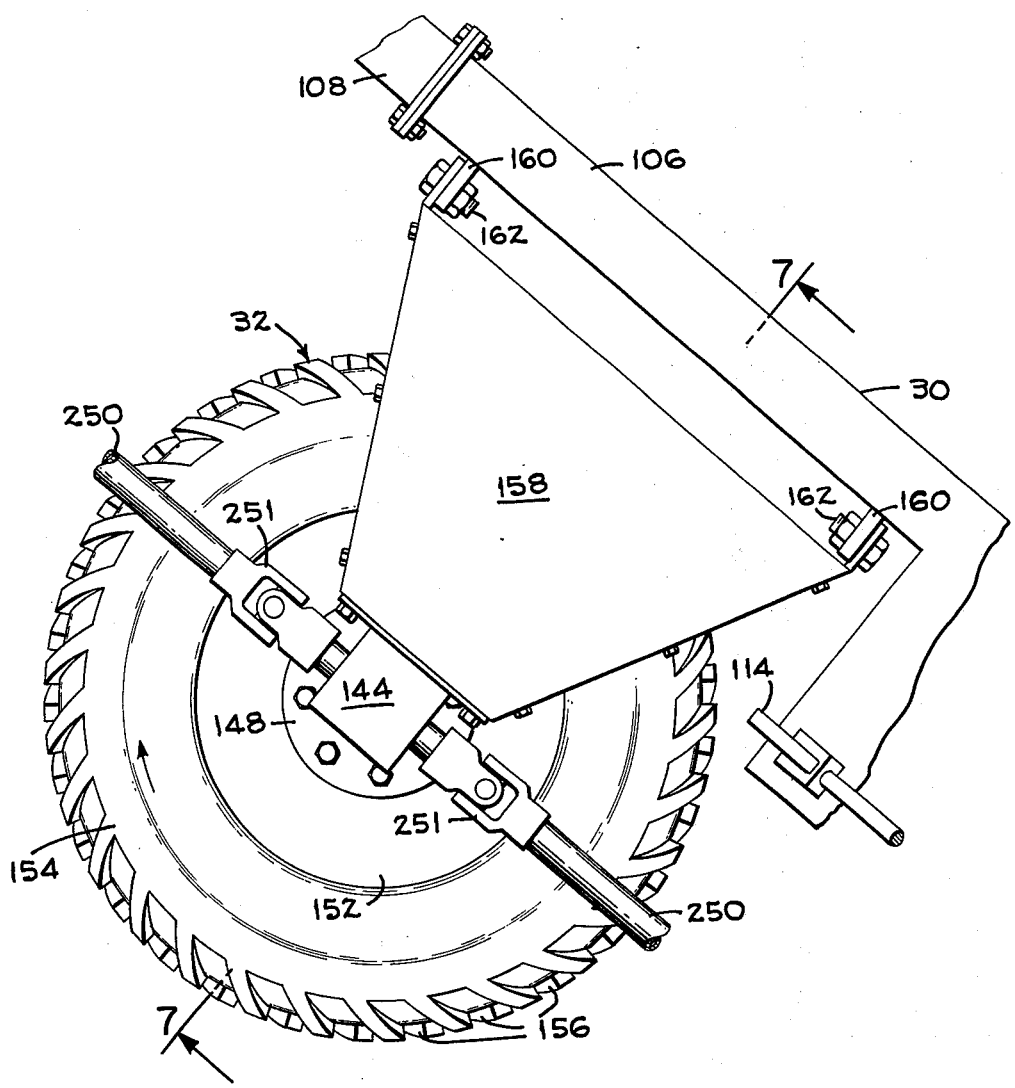
FIG_6
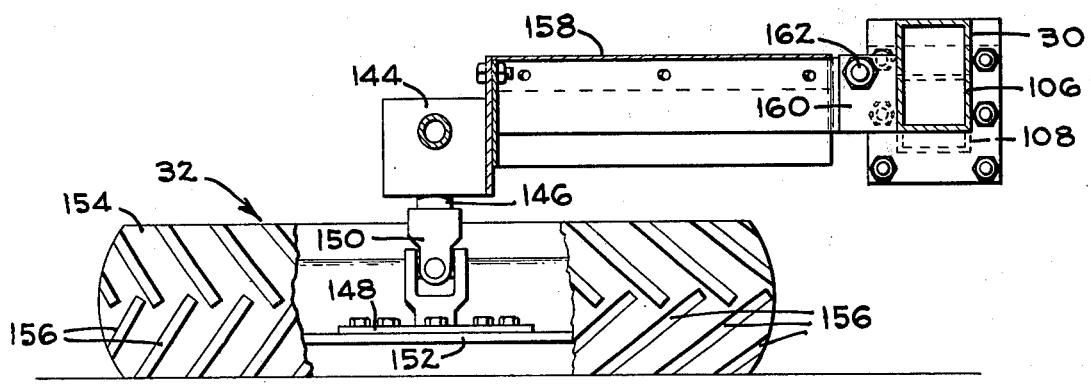
FIG_7

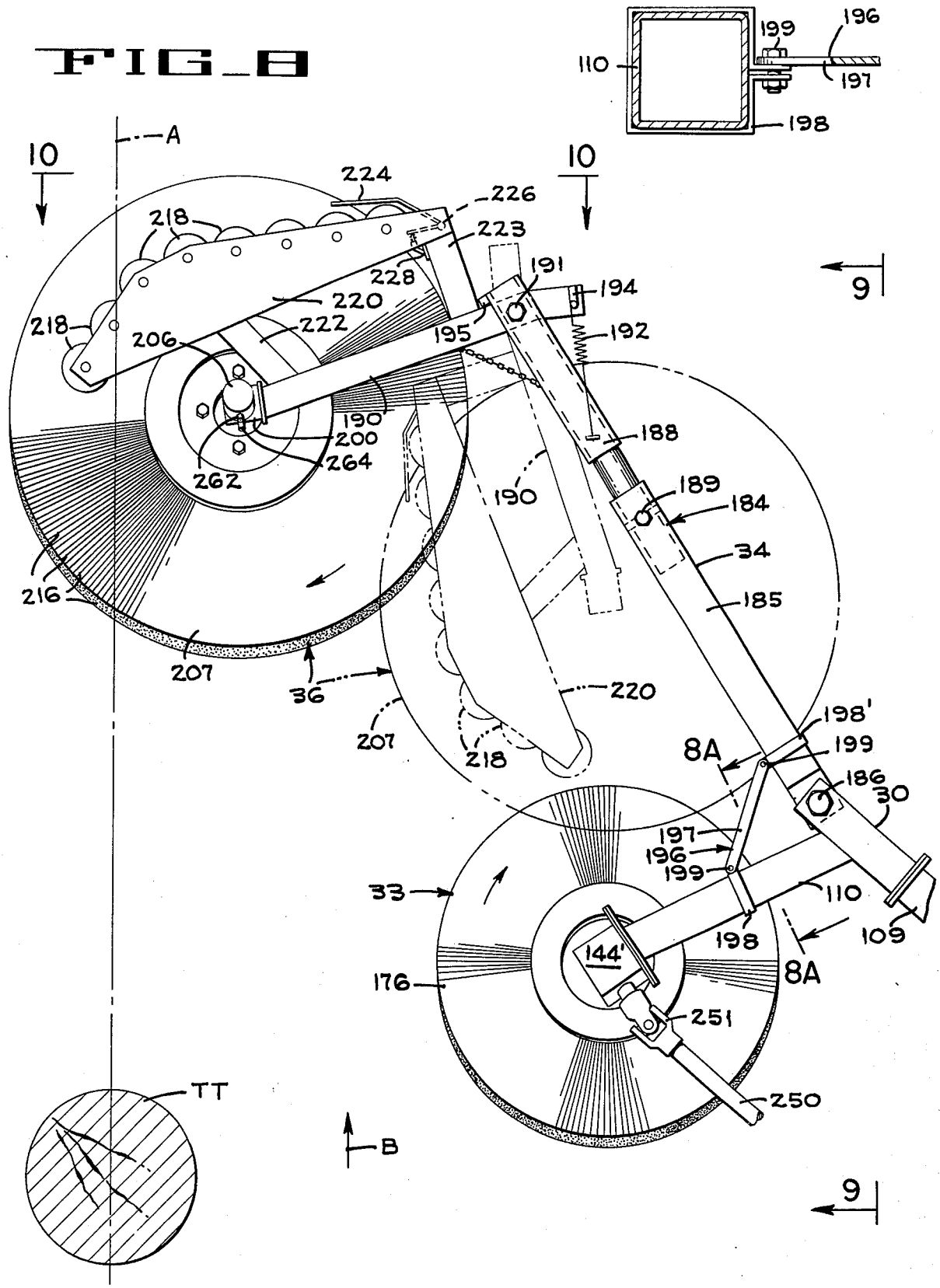

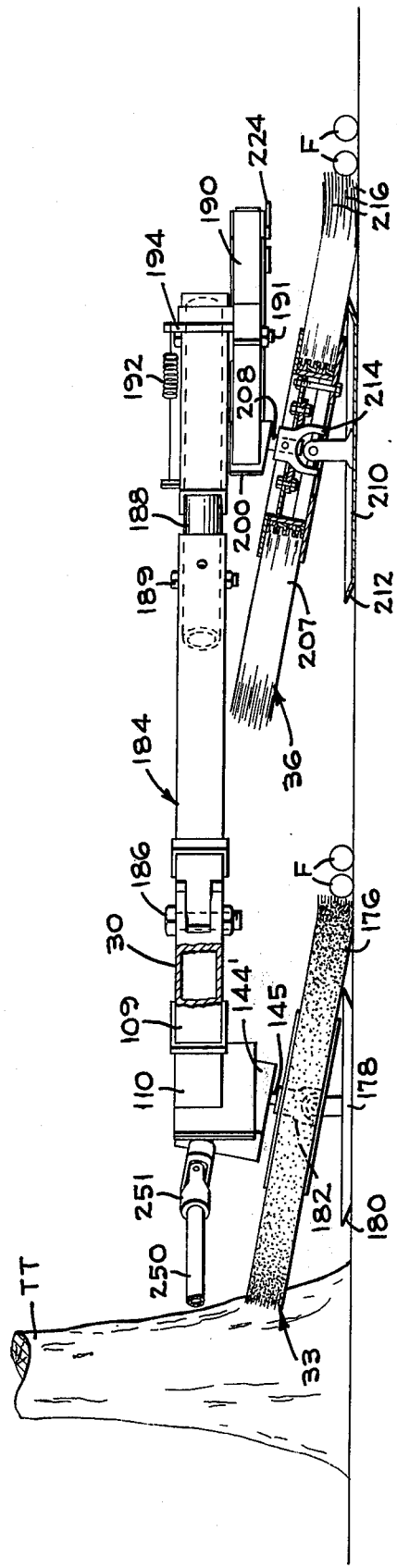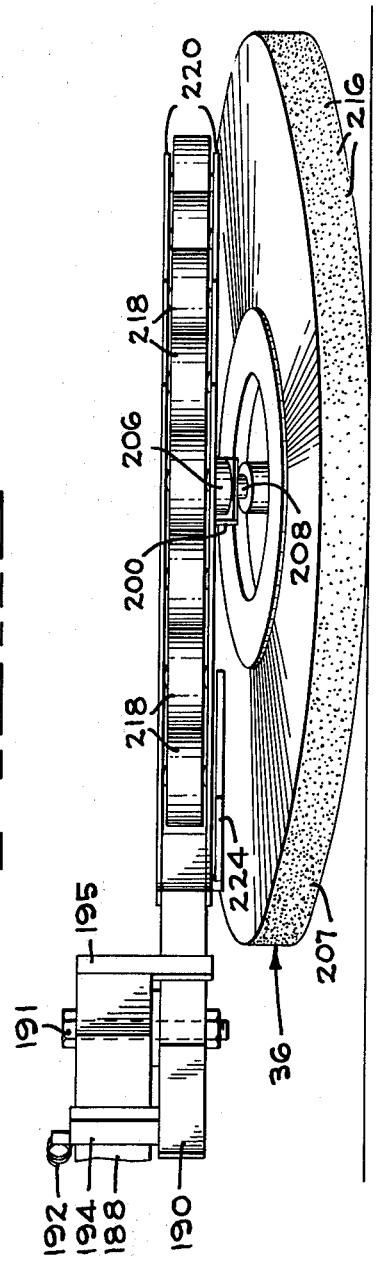

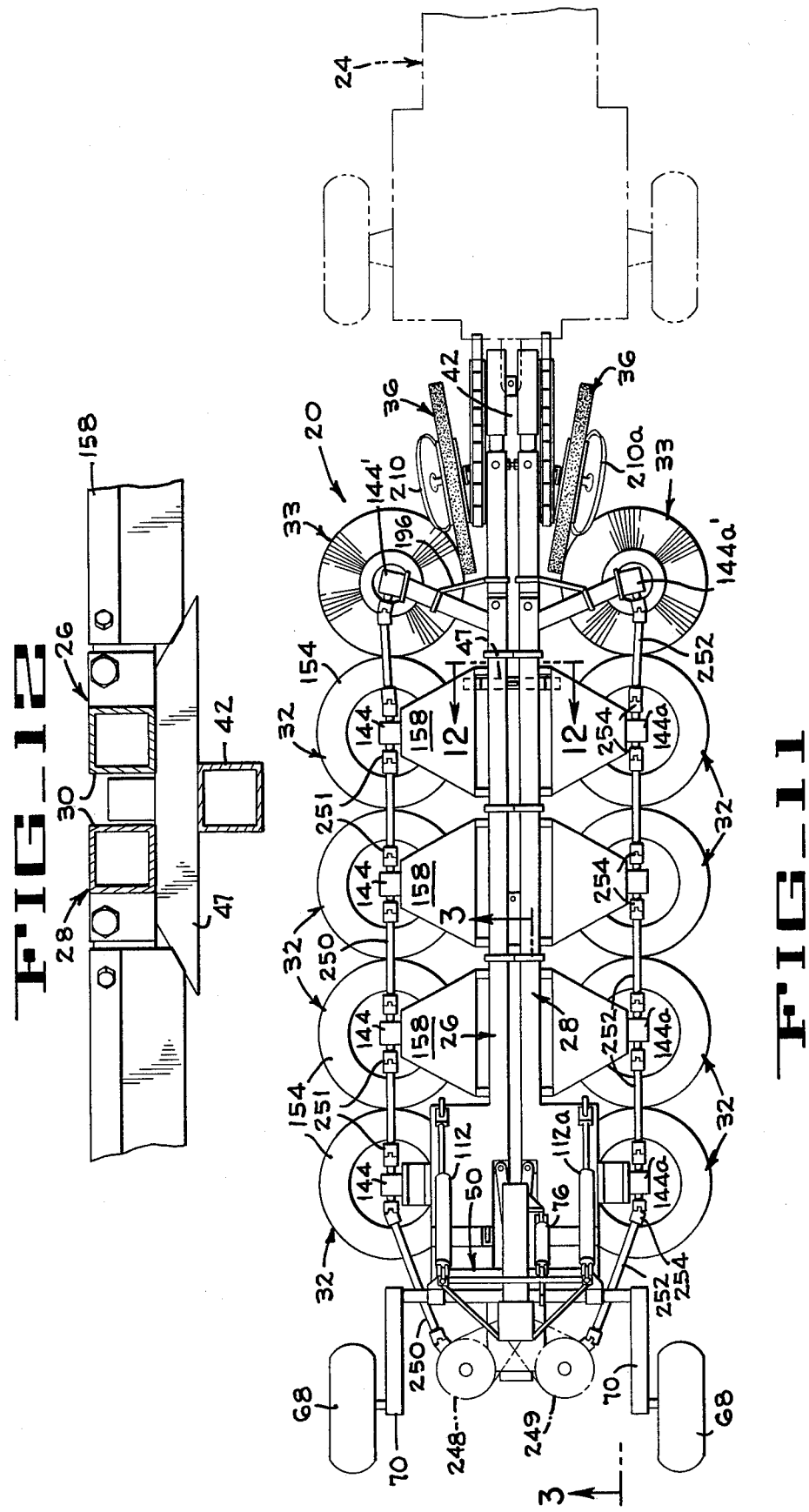

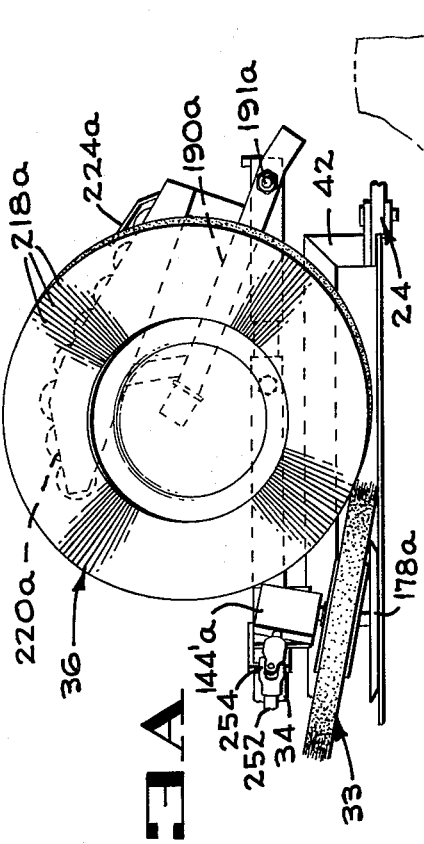
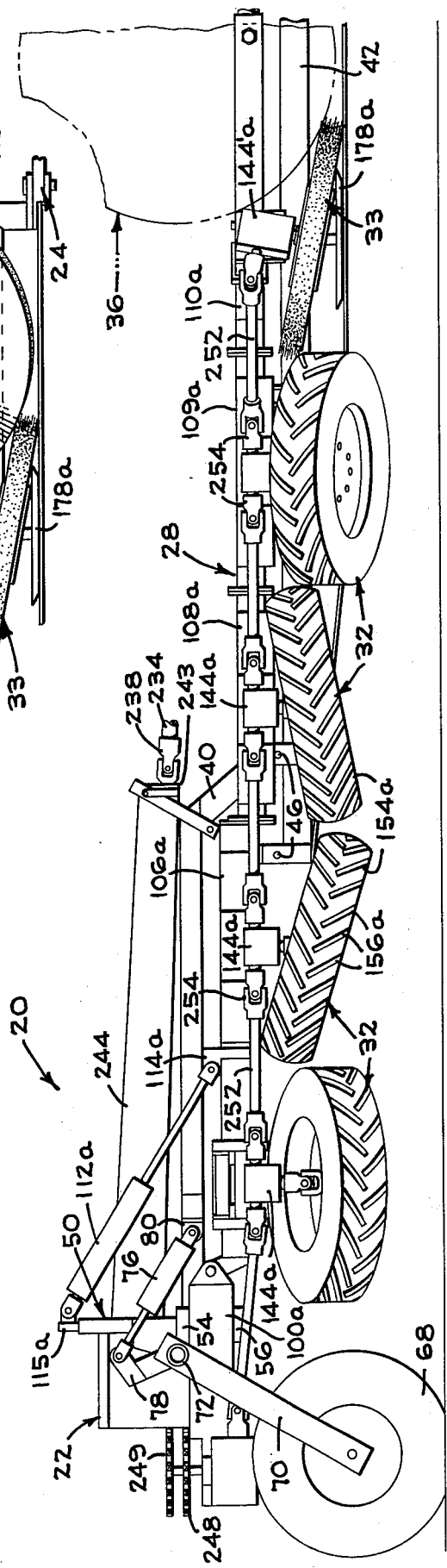
FIG_13A
FIG_13

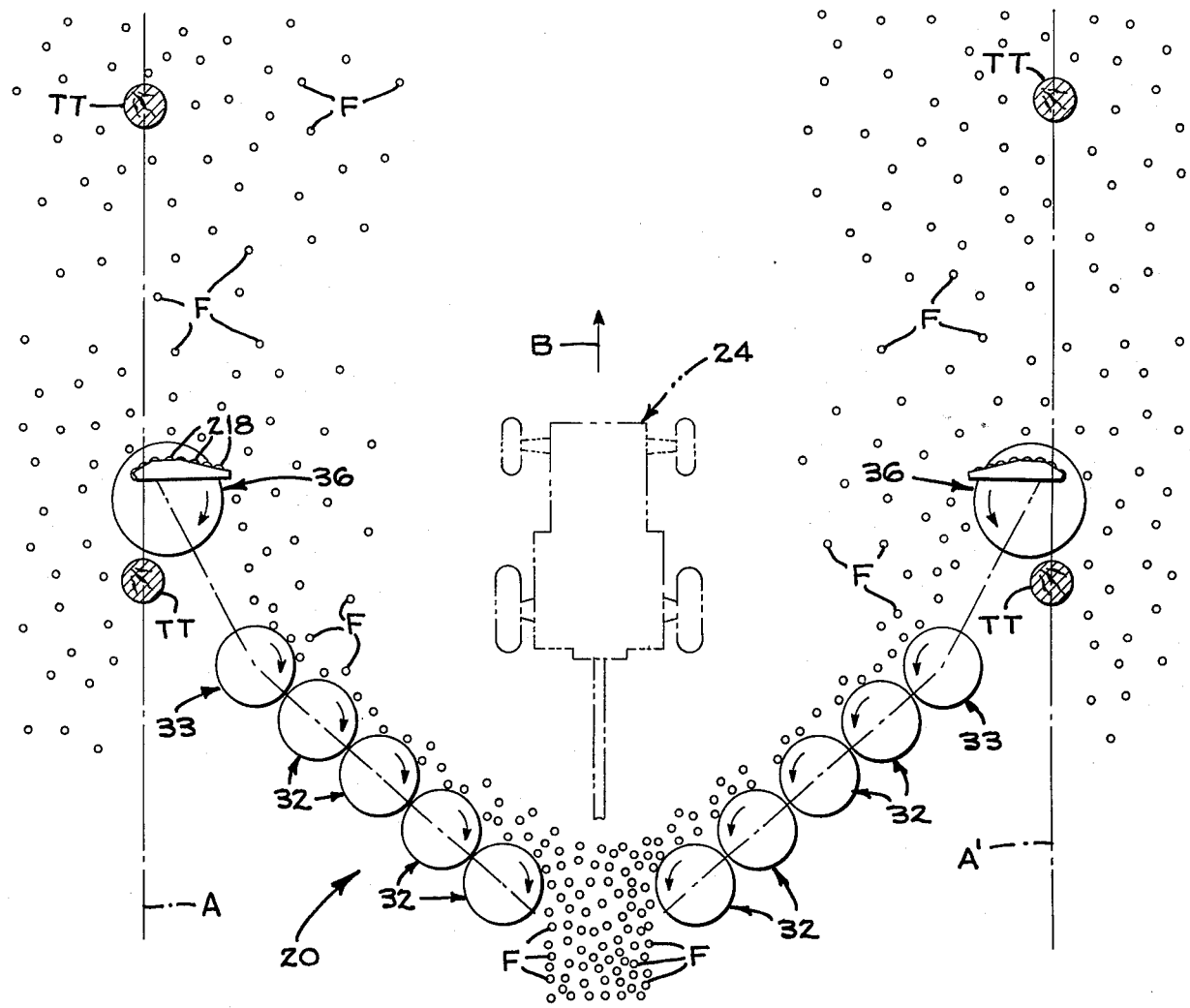
FIG_14
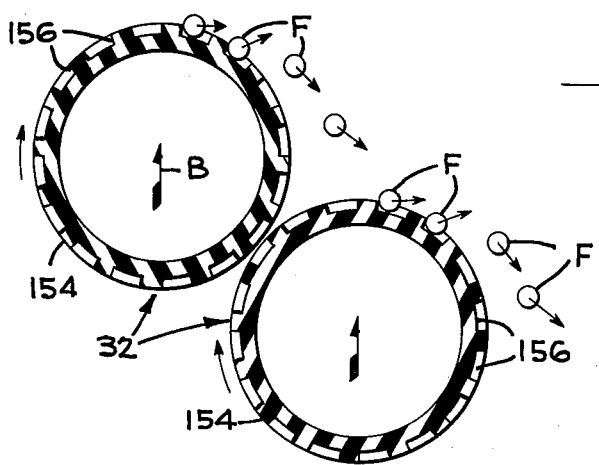
FIG_16
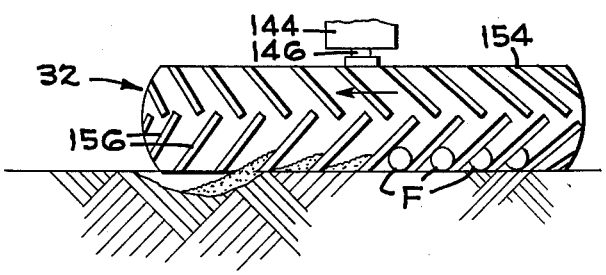
FIG_15

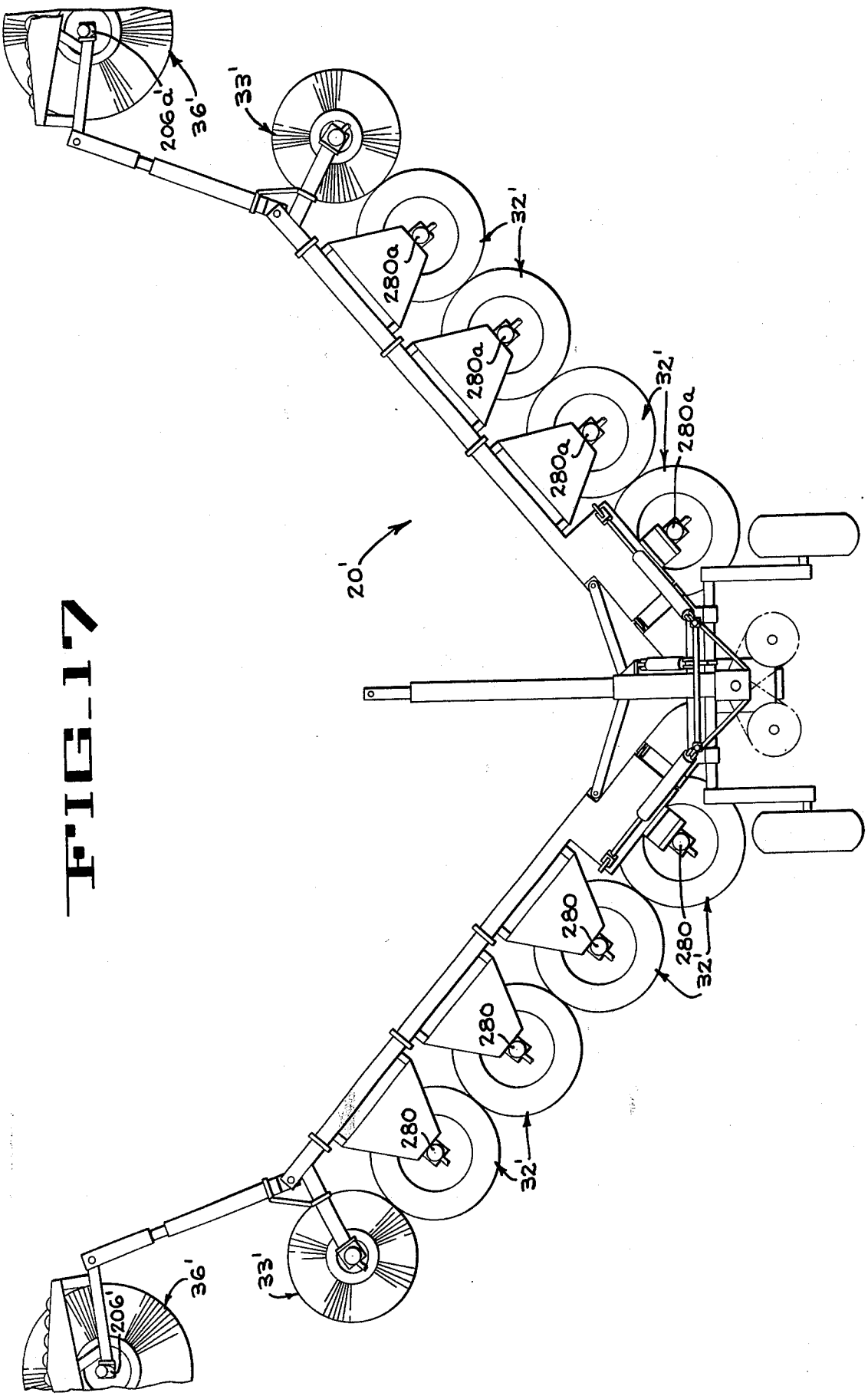

ROTARY WINDROWING MACHINE

CROSS REFERENCE TO RELATED APPLICATION

The driven windrowing brush assembly on the outer end of each wing is substantially the same as that disclosed in my copending application Ser. No. 463,328 which was filed on Apr. 23, 1974, is assigned to the assignee of the present invention, and is to be incorporated herein by reference.

BACKGROUND OF THE INVENTION

1. Field of the Invention

This invention pertains to the windrowing art, and more particularly relates to a windrowing machine for rollable articles such as fruit or the like.

2. Description of the Prior Art

Windrowing machines for citrus fruit or the like are known in the art. One such machine is disclosed in U.S. Pat. No. 3,762,140 which issued to Donald P. Block on Oct. 2, 1973 and is assigned to the assignee of the present invention. The Block machine includes a main rake and a slide rake both of which are rotated about generally horizontal axes to move the articles into a windrow. The slide rake is reciprocated into and out of the tree row centerline, and because certain fruit near the tree row centerline are at times exposed to downwardly moving rake tines of the slide rake at the outer end of the slide rake, a certain amount of this fruit may become impaled by the tines. The varying contour of the ground over which the elongated rows of tines of the Block windrower moves also presents a problem since even though the rakes are supported to best follow the contour of the ground, some spots intermediate the ends of the rows of tines are at times much lower than the average contour and accordingly the tines may pass over some fruit or impale or otherwise damage fruit lying in the recess. Another windrowing machine which was developed prior to the present invention includes a plurality of aligned rotary brushes each of which is carried by a support frame on a tractor and each of which is arranged to be rotated about a corresponding generally vertical shaft to move articles engaged by the brushes into a windrow. Each vertical shaft is mounted at the end of a separate support arm that is pivotally connected to said support frame, and the attached brush is supported at ground level by a rotary concave disc which rests on the surface of the ground.

SUMMARY OF THE INVENTION

The rotary windrowing machine of the present invention includes a plurality of independently supported windrowing assemblies preferably wheel and tire assemblies, which are pivotally attached to a boom and are pulled through the orchard or grove with the vehicle. Each assembly is supported on the ground with its axis of rotation upright. Each assembly is independently and pivotally attached to the associated boom to move therewith and relative thereto. Each assembly also includes a universal joint which connects it to a generally vertical shaft of drive means for rotating the assembly. Rotation of the several assemblies not only progressively drives the fruit from one assembly to the other toward the windrow being formed centrally of the machine, but also flattens the ground upon which they are supported.

It has been determined that for best results with wheel and tire assemblies used as the windrowing means the lug tread of the tires should be oriented with the direction of rotation of the tire so that the tread lifts, rather than depresses, the dirt and fruit. In this way the fruit is not forced into the ground and damaged, but tends to be lifted thus more easily moving the fruit into the centrally disposed windrow. Also, the dirt at high portions of the ground is lifted by the tread and is thereafter allowed to gravitate downwardly when low spots are reached; thus each tire more effectively flattens that portion of the ground over which it rides. Although rocks and clods should not be present in the soil, it will be appreciated that the tires and tread are quite sturdy.

It is an object of the present invention to move a semi-rigid windrowing assembly that is supported on its side over uneven ground having rollable articles thereon, and to provide means for rotating the assembly while freely floating on the ground to flatten the soil and to move the articles in its path in a predetermined direction.

BRIEF DESCRIPTION OF THE DRAWINGS

FIG. 1 is a plan illustrating the preferred embodiment of the rotary windrower having its windrowing wings in operative windrowing position and further illustrating a towing vehicle in phantom lines.

FIG. 2 is an enlarged plan of the central portion of the windrower, certain parts being cut away.

FIG. 2A is an enlarged vertical section taken along lines 2A—2A of FIG. 2.

FIG. 3 is a vertical section taken substantially along lines 3—3 of FIG. 11 with the main booms being swung to a transport position but with the wheels being in a lowered windrowing position and with the tongue supporting stand being in its active supporting position.

FIG. 4 is a section taken along lines 4—4 of FIG. 3 illustrating the central frame of the machine.

FIG. 5 is a vertical central section taken substantially along lines 5—5 of FIG. 2.

FIG. 6 is an enlarged plan of one of the left hand wheel and tire assemblies illustrating the manner of pivotally mounting the assembly to the boom.

FIG. 7 is an elevation partially in section taken along lines 7—7 of FIG. 6 illustrating the universal connection between the wheel and tire assembly and its drive mechanism.

FIG. 8 is an enlarged plan illustrating in solid lines the outer left hand rotary brush assemblies with the outer brush assembly partially disposed in a tree row centerline A, and further illustrating in dotted lines a position pivoted away from the trunk.

FIG. 8A is a section taken along lines 8A—8A of FIG. 8.

FIG. 9 is a longitudinal elevation of the two brush assemblies of FIG. 8 looking in the direction of arrows 9—9 of FIG. 8.

FIG. 10 is a section taken along lines 10—10 of FIG. 8 illustrating the pivotal mounting of the outer brush boom.

FIG. 11 is a plan of the windrowing machine showing the main booms pivoted in a stowed or transport position with the outer brushes pivoted to a vertical transport position, the windrowing machine also being shown connected to a towing vehicle by a tongue extension.

FIG. 12 is an enlarged transverse section taken along lines 12—12 of FIG. 11 illustrating a boom supporting bar.

FIGS. 13 and 13A together define an enlarged side elevation of FIG. 11 illustrating the windrowing machine in its transport position.

FIG. 14 is an operational view in plan illustrating the windrowing operation between two tree rows.

FIG. 15 is an enlarged elevation of one of the wheels illustrating the action of the tire lug tread on the fruit and on the loose soil.

FIG. 16 is a diagrammatic plan illustrating the direction of movement of the vehicle and the manner in which one wheel and tire assembly advances fruit to the next adjacent wheel and tire assembly.

FIG. 17 is a plan view similar to FIG. 1 of a modified form of the invention illustrating another type of drive means for the wheel and tire assemblies, such drive means being illustrated as hydraulic motors.

DESCRIPTION OF PREFERRED EMBODIMENT

The preferred embodiment of the rotary windrowing machine 20 (FIGS. 1, 3, 11 and 13) of the present invention comprises a mobile chassis 22 connected to a towing vehicle or tractor 24 which moves the machine 20 between two rows A and A' of trees or the like from which articles such as citrus fruit F (FIG. 14) has been previously shook and is to be windrowed. The windrowing machine 20 includes a pair of windrowing wings 26 and 28 each of which is hydraulically moved between windrowing positions projecting outwardly and forwardly of the chassis 22 as illustrated in FIG. 1, and a stowed or transport position parallel with the direction of movement of the vehicle 24 as illustrated in FIGS. 11 and 13. Each wing includes a main boom 30 which carries a plurality of driven windrowing wheel and tire assemblies 32, a small diameter driven brush assembly 33 which supports the outer end of the main boom 30, and a pivotable brush boom 34 which carries an outer driven brush assembly 36 for sweeping articles from the centerline of the associated tree row. The wheel and tire assemblies 32 and soil flattening portions of the brush assemblies 33 and 36 are suspended from their respective booms for universal movement thereby not only windrowing the fruit but also flattening the ground upon which they rotate.

In the preferred embodiment of the windrowing machine of the present invention the tractor 24 is coupled to a short main tongue 40 (FIGS. 1, 11 and 13) during the windrowing operation, and is coupled to an elongated removable extension tongue 42 that is connected to the main chassis tongue 40 by bolts 46 (FIG. 13) when the wings 26 and 28 are in the stowed position in order to provide room for the wings to fold inwardly and lie within the maximum permissible eight foot width for transportation along public roads. FIGS. 11 and 12 illustrate a cross member 47 on the tongue 42 that is provided to support the forward ends of the wings when the wings are in their stowed positions. However, if desired, the extension tongue may remain connected to the chassis at all times. If the extension tongue is to be used at all times, hydraulic hoses and telescoping drive shafts are used that are somewhat longer than those used in the preferred embodiment so as to deliver power from the standard hydraulic system and power take-off system of the tractor as will be described.

More particularly, the chassis 22 (FIGS. 2–5) of the rotary windrowing machine 20 includes the tongue 40 which is rigidly secured to a frame 50. The frame 50 is defined in part by rigid horizontal members 52, 54, 56, and short rear horizontal members 58 and 60 (FIG. 3). The horizontal members are rigidly interconnected together and to the tongue 40 by other suitable vertical frame members including a central inverted U-shaped gear box housing 62 (FIG. 5) and downwardly projecting gear box supporting bracket 64 and 65. Upstanding tubes 66 are rigid with the members 52 and 54 and are further supported by diagonal braces 67 from the U-shaped housing 62.

A pair of chassis supporting wheels 68 are rotatably mounted on one end of a pair of arms 70 having their other ends rigidly secured to a tubular shaft 72 journaled in bushings 74 rigid with the frame. A hydraulic lift cylinder 76 is pivotally connected between a lever 78 secured to the tubular shaft 72 and a bracket 80 secured to the tongue 40 to pivot the chassis 22 between a lowered windrowing position as illustrated in FIG. 1 and a raised transport position as illustrated in FIG. 13.

In order to support the tongue 40 in an elevated position for ease in coupling and uncoupling the windrowing machine from the tractor, a tongue supporting stand 82 (FIG. 3) having a vertically adjustable foot 84 is pivoted by a pin 86 to the tongue 40 and is held in its operative vertical position by a brace 87 connected between the tongue and the stand by pivot pins 88 and 90. The stand 82 may be placed in a generally horizontal inoperative position by removing the pin 88 from the tongue and brace and reinserting it through the tongue and through holes 92 in the stand after pivoting the stand to a rearward generally horizontal position.

Each wing 26,28 is mounted on the chassis 22 for vertical and horizontal pivotal movement. Each wing is a mirror image of the other and accordingly only the left wing 26 will be described in detail and the same numerals followed by the letter "a" will be used to identify equivalent parts of the right wing.

The left wing 26 (FIGS. 2–5) includes a boom 30 that has a horizontal base 100 of tubular cross section pivotally supported about a generally vertical axis between the horizontal frame members 54 and 56 (FIG. 4) by a pivot shaft 102. Pairs of yokes 104 (FIGS. 2, 3 and 5) are connected to the outer end of the base 100 and are pivotally connected to ears 105 projecting upwardly from an intermediate boom section 106 by pins 107. As best shown in FIG. 13, which shows the right wing 28, intermediate boom section 106a and the section 108a as well as the two outer sections 109a and 110a of the boom are slightly lower than the base portion 100a. As shown in FIG. 1, the outer section 110 is not aligned with the other boom sections but is angled transversely outward. A boom lifting cylinder 112 is pivotally connected between a bracket 114 on the intermediate section 106 and a vertical shaft 115 journaled in the adjacent tube 66 of the chassis frame. The right and left hand boom lifting cylinders 112a and 112 may be independently operated by hydraulic controls to pivotally lift the booms into transport position or to raise the booms over obstructions as required.

The wings 26 and 28 may be pivoted horizontally from the transport position parallel with the longitudinal axis of the chassis to any one of a plurality of selected windrowing positions angled outwardly and forwardly for handling different tree row spacings, for example spacings of 20 feet, 25 feet or 30 feet. In order to horizontally pivot the wings 26 and 28, pivot arms 118 and 120 (FIGS. 2 and 5) are pivotally connected by pivot pins 122 and 124 to the wings 26 and 28, respectively, and to a bolt 126 secured to a carriage 128. The carriage 128 is longitudinally slidable in channel guides 130 rigid with the chassis frame 50 below the tongue 40. A hydraulic wing spreading cylinder 132 (FIGS. 2 and 3) has its piston rod 134 connected to the carriage 128 and has its cylinder 136 connected to the frame 50 by a pin 138 (FIG. 3). Thus, extension of the piston rod 134 will spread the wings, and full retraction of the piston rod will move the wings to the FIG. 11 transport position.

As illustrated in FIG. 1, each wing 26 and 28 includes four windrowing wheel and tire assemblies 32 with all four assemblies being identical except for the manner of mounting the assemblies to the associated boom. Each assembly comprises power transmitting means such as a gear box 144 (FIG. 6) having a downwardly projecting output shaft 146 connected to an adapter plate 148 by a universal joint 150. The adapter plate is bolted to a wheel 152 having a pneumatic tire 154 thereon. The tire is preferably a standard tractor tire that is approximately three feet in diameter and has the lower lug tread 156 angled downwardly and rearwardly relative to the direction of movement of the tire 154 thereby tending to lift loose soil and articles being windrowed. Although tractor wheel and tires are the preferred windrowing members because of their ready availability, it will be appreciated that other rigid or semi-rigid rotary windrowing means, such as steel wheels with similar tread patterns, may be used if desired.

The gear box 144 of each of the three outer assemblies 32 is bolted to the end of a pivot bracket 158 which is pivotally connected to ears 160 of the associated boom by pivot bolts 162.

The innermost wheel and tire assembly 32 is connected to the associated boom by a parallelogram linkage 164 (FIGS. 2 and 2A). The parallelogram linkage includes a pair of angle bars 166 bolted to the associated gear box 144 and a similar pair of angle bars 168 bolted to the associated boom. An upper link 170 and lower link 172 are pivotally connected to the angle bars by bolts 174.

The inner brush assembly 33 (FIGS. 8–10) and outer brush assembly 36 on each wing are mirror images of the corresponding assemblies on the other wing. Accordingly, only the left assemblies illustrated in FIG. 1 will be described in detail.

The inner brush assembly 33 comprises a gear box 144' rigidly connected to the boom section 110 and having a downwardly and rearwardly angled output shaft 145. A brush 176 is rigidly secured to said shaft 145 to rotate therewith in an inclined plane as illustrated in FIG. 9, and a depth control disc 178 having an upturned flange 180 is connected to said shaft by a universal joint 182 for rotation therewith and for universal movemovement relative thereto. While the brush 176 is sweeping fruit inwardly, the rotary universally mounted movable disc 178 functions to support the outer end of the boom 30 at a predetermined height above the ground while flattening the ground upon which it rides as described in more detail in my aforementioned application.

The outer brush assembly 36 (FIGS. 8–10) comprises a three-piece brush boom 184 having a first section 185 pivoted to the main boom 30 by a vertical bolt 186. A second section 188 is pivoted about the longitudinal axis of the boom sections 185,188 and is held in operative windrowing position as illustrated in FIGS. 8 and 9 by a bolt 189 which fits through aligned holes in the squared tubular boom section 185, and through an oversized hole (not shown) in a circular portion of the boom section 188 to allow a certain amount of vertical movement of the outer brush 36 when following the ground contour. Another hole (not shown) is drilled in the boom section 188 normal to the oversized hole and will receive the bolt 189 to lock the outer brush assembly 36 in the transport position after the outer boom section has been rotated 90°. The third section 190 of the brush boom 184 is pivoted to the section 188 by bolt 191 (FIGS. 8 and 10) and is urged forwardly by a spring 192 connected between the boom section 188 and an upstanding bracket 194 on the boom section 190. A stop plate 195 on the section 188 limits the outward movement of the boom section 190.

A brace 196 (FIGS. 8 and 8A) is provided in order to releasably lock the boom section 184 at an angle to the boom section 109 of the main boom 30 when the windrower is in operative position as illustrated in FIGS. 1 and 10; or in a transport position parallel with the section 109 (FIG. 11) when the windrower is in its transport position. The brace includes a bar 197 connected to rectangular clamping straps 198,198' by bolts 199 that may be loosened to permit adjustment of the outer rotary brush between the two above mentioned positions.

The rotary components of the outer brush assembly 36 are substantially the same as that disclosed in my above mentioned copending application. The outer assembly 36 includes a bracket 200 (FIGS. 8–10) secured to the outer boom section 190 and supports a hydraulic motor 206 at an angle relative to the generally horizontal axis of the boom section 190. A brush 207 is rigidly secured to the drive shaft 208 of the hydraulic motor 206. A depth control disc 210 having an upturned flange 212 is connected to the shaft 208 by a universal joint 214. The disc 210 and brush 207 rotate together with the disc 210 serving to level the ground and support the brush at a height which will cause the forward end of the brush to engage and move fruit in the adjacent tree row centerline inwardly to the adjacent inner brush assembly 33.

The preferred position of the windrowing machine 20 is as illustrated in FIG. 1 wherein the bristles 216 of the outer brush 207 will deflect when a tree trunk TT is contacted. In order to prevent damage to the outer brush assembly and to prevent undue deflection of the bristles 216, a series of rollers 218 journaled between parallel plates 220 are positioned to contact the tree trunk TT and to deflect the brush inwardly from the solid line position (FIG. 8) and up to the phantom line position if necessary. The parallel plates 220 are connected by braces 222 and 223 secured between the plates 220 and the boom section 190. As illustrated in FIG. 8, the rollers 218 lie adjacent the outer forward periphery of the brush to permit only a predetermined amount of bristle deflection. A horn lever 224 (FIG. 8) pivoted at 226 is urged outwardly by spring loaded switch 228. If the windrowing machine is so grossly misaligned that the horn lever is contacted by a tree trunk TT, a horn is sounded warning the operator to stop the vehicle.

The drive system 230 (FIGS. 1 and 3) for the windrowing wheel assemblies 32 and the inner brush assemblies 33 receive their power from a standard power take-off unit 232 on the tractor 24 by means of a telescoping shaft 234 having universal joints 236 and 238 on opposite ends thereof. The universal joint 238 couples the shaft 234 to another telescoping shaft 240 which is coupled to the input shaft 241 of a central gear box 242. The forward end of the shaft 240 is supported by a bearing 243 and is covered with a protective housing 244. The output shaft 245 of the central gear box 242 is connected to a left gear box 246 (FIG. 2) and a right gear box 247 by chain drives 248 and 249. The left gear box 246 drives the five left hand gear boxes 144 (FIG. 1) of the wheel and tire assemblies and the left inner brush assembly 33 through telescoping shafts 250 and cooperating universal joints 251. Similarly, the right gear box 247 drives the gear boxes 144a of the left wheel and tire assemblies and the right inner brush assembly 33 through telescoping shafts 252 and cooperating universal joints 254.

The hydraulic motors 206 and 206a (FIG. 1) which control the left and right hand outer brush assemblies 36, respectively, receive their power from a standard hydraulic system 260 powered by the engine of the tractor 24. It will be understood that hydraulic hoses 262 and 264 (FIG. 8) are provided to couple the motors 206 and 206a to associate hydraulic control valves 266 (FIG. 1) on the tractor 24. Although not illustrated, the left and right hand pairs of hoses follow the tongue 40 to approximately the wing pivot points and then extend outwardly to the associated left and right motors 206 and 206a. Similar hydraulic hoses (not shown) and valves are provided for hydraulic cylinder 76, 112, 112a and 136. It will be understood that the length of the several hydraulic hoses is sufficient to permit coupling of the hoses to the hydraulic system 260 when the tractor is coupled to the tongue extension 42.

FIG. 17 illustrates a second embodiment of the rotary windrowing machine 20' which is identical to the first embodiment except that all of the windrowing wheel and tire assemblies 32' and the brush assemblies 33' and 36' are driven by hydraulic motors 280,280a and 206', 206a'. It will be understood that the left and right hand groups of wheel assemblies and brush assemblies may each be controlled through a manual valve, and separate speed control valves to each hydraulic motor. In this way the brush and wheel assemblies in each wing may be driven at either the same speed or at different speeds depending upon the setting of the speed control valves. For example, the speed control valves may be adjusted so that the brush speeds are slowest and so that the speed of each wheel will progressively increase from the outer wheel in each wing to the inner wheel. In this way the progressively increasing load of fruit being windrowed will more effectively be handled. It will also be understood that with the speed control valves preset as desired, a manual valve may be controlled to simultaneously speed up or slow down all of the hydraulic motors in an associated wing.

In operation of the preferred embodiment of the rotary windrower 20 of the present invention, the wings 26 and 28 (FIG. 1) are spread to the windrowing position relative to the specific spacing of tree rows A and A' by actuation of hydraulic cylinder 136. With the power takeoff 232 of the tractor 24 engaged to drive all windrowing wheel and tire assemblies 32 in the directions indicated in FIG. 1, and with the hydraulic system 260 engaged and activated by controls 266 to drive the brushes 36 in their indicated directions, the tractor is driven through the citrus grove in the direction indicated by arrow B (FIG. 1). Fruit which has been previously shaken from the tree is then moved inwardly as illustrated in FIG. 14 from the tree row centerline by the two sets of brushes 33,36 and thereafter by the wheel and tire assemblies 32.

The free floating, rotating discs 178,210 (FIG. 9) which supports the brushes 176,207 of the associated brush assemblies 33,36 through universal joints serve to flatten the ground upon which they ride for accurately controlling the height of the brush assemblies. As mentioned previously, each disc 176 establishes the height of the outer end of the associated boom 30 above the ground. Each disc 207 determines the elevation of the associated outer brush assemblies 36 above the ground while sweeping the fruit inwardly to the adjacent wheel and tire assembly 32. Each wheel and tire assembly is driven through a universal joint 150 and accordingly lies flat on the ground. As indicated in FIG. 15, if the ground is not flat but includes high spots and low spots, the lug tire tread 156 lifts the loose soil from the high spots and allows it to gravitate downwardly to fill the low spots.

It will further be noted that the tread tends to raise the fruit as it moves along a path toward the center of the machine along a path somewhat as illustrated in FIG. 16.

During the windrowing operation the outboard inner brush assemblies 33 (FIG. 1) ride upon the ground and determine the average elevation of the booms 30. The other wheel and tire assemblies are free to pivot upwardly or downwardly as determined by the contour of the particular path of soil upon which they ride. Thus, the independent suspension of the wheel and tire assemblies 32 cause the assemblies to ride on and flatten the soil and provide little opportunity for fruit to enter a low spot and be crushed below a wheel and tire assembly. In this regard, it will be appreciated that large clods or rocks which are not flattened into the soil will be windrowed along with the fruit and accordingly will not lift the wheel and tire assemblies off the ground.

In the event the operator has not properly adjusted the span of the wings 26 and 28, or is not driving the tractor centrally between the tree rows A and A' so that, for example, the left brush assembly is positioned too far to the left (FIG. 8), the rollers 218 will contact the tree trunk TT causing the brush 207 to pivot clockwise a sufficient distance to clear the trunk as illustrated by the dotted line position of the brush. The spring 192 returns the brush 207 to its original position after the brush has moved past the tree trunk.

When it is desired to move the windrowing maching 20 to another orchard or grove, the operator lowers the stand 82 to the position illustrated in FIG. 3, uncouples the tractor 24 from the windrower, bolts the tongue extension 42 (FIGS. 12 and 13) on the tongue 40 and couples the tongue extension 42 and hydraulic system 260 to the tractor 24. The hydraulic cylinder 76 is then extended to raise the rear end of the windrower to the position illustrated in FIG. 13 and the stand 82 is retracted. The lift cylinders 112,112a are then retracted sufficiently to lift the forward end of the booms 30 above the cross member 47, and the cylinder 132 is retracted to move the wings to the transport position illustrated in FIG. 11. The brush assemblies 36 are then pivoted 90° about the longitudinal axis of the brush boom sections 185,188 and bolted in the transport position shown in FIGS. 11 and 13. The windrower may then be moved from place to place by the tractor 24 or other towing vehicle such as a truck if long distances on paved roads are to be covered.

Although the foregoing description of the preferred embodiment of the windrowing machine refers to citrus fruit as the articles being windrowed, it will be understood that the machine may be used to windrow many other types of rollable articles such as other fruits, vegetables, and nuts as well as rollable non-agricultural products.

In the preferred embodiment of the invention, equal size windrowing wheel and tire assemblies have been illustrated and have been described as being driven at the same speed. It will be understood, however, that it is within the scope of the invention to drive the wheels on each wing at different speeds and to provide wheel and tire assemblies which differ in size with the larger wheel and tire assemblies near the center of the vehicle.

From the foregoing description it is apparent that the windrowing machine of the present invention comprises a towed vehicle which includes a pair of wings, the span of which may be easily adjusted to windrow fruit in orchards that have different tree row spacings. The windrower includes a pair of driven rotary brush assembly on the outer end of each wing with the outer brush arranged to sweep fruit from the tree row centerline and for deflecting inwardly away from the tree trunks upon contact with the trunk. Each wing also includes a plurality of free floating driven wheels which progressively advance the fruit inwardly to provide a windrow centrally of the vehicle. Each wheel and tire assembly is connected by a universal joint to its drive shaft to permit it to conform to the contour of the ground and to utilize the lug tread of the tires to aid in flattening the ground over which it rides while advancing the fruit toward the windrow. The wings of the windrower may also be raised above the ground in a transport position with the outer brush assemblies pivoted 90° to vertical positions so as to lie within the maximum vehicle width permitted for normal road transportation.

Although the best mode contemplated for carrying out the present invention has been herein shown and described, it will be apparent that modification and variation may be made without departing from what is regarded to be the subject matter of the invention.

What I claim is:

1. In a windrowing machine for windrowing articles from an article supporting surface which may vary in contour, the combination of a rotatable windrowing means of at least semi-rigid construction defined by a generally continuous outer peripheral surface which extends in a generally vertical plane and which is adapted to move articles, means for supporting one side of side windrowing means at a predetermined distance above the article supporting surface, means for advancing the rotatable windrowing means along a predetermined path, said means for advancing being coupled to said means for supporting the windrowing means, drive means including a generally vertically extending drive shaft for rotating said rotatable windrowing means in a predetermined direction, and universal joint means connecting said drive shaft to said rotatable windrowing means for universal movement allowing the rotatable windrowing means to follow the contour of the article supporting surface while moving along said path.

2. An apparatus according to claim 1 wherein said semi-rigid rotatable windrowing means is a wheel and tire assembly.

3. An apparatus according to claim 1 wherein the article supporting surface is relatively loose soil and wherein said rotatable windrowing means has an upright cylindrical surface with lug treads on its periphery for flattening the soil in said path and for aiding in propelling the articles being windrowed.

4. An apparatus according to claim 3 wherein the soil contacting lug treads are angled upwardly and rearwardly relative to the direction of rotation of said rotatable windrowing means for lifting loose soil from high portions of the surface and depositing the lifted soil in low portions of the surface to flatten the soil.

5. A rotary windrowing machine for windrowing articles on an article supporting surface which may vary in contour comprising: a mobile vehicle having a chassis movable over the article supporting surface, power means connected to said vehicle for moving said vehicle along a path, means defining a wing mounted on said chassis for horizontal and vertical movement, a plurality of rigid or semi-rigid rotatable windrowing means each having a lower face resting on the article supporting surface and a generally upright cylindrical periphery having article advancing means thereon for progressively moving articles inward from one windrowing means to the next adjacent windrowing means, drive means including a substantially vertical shaft for rotating each of said windrowing means, universal joint means coupling each of said windrowing means to a corresponding vertical shaft for universal movement, and means independently connecting said plurality of drive means to said wing defining means for vertical movement relative to each other enabling said plurality of rotary windrowing means to independently follow the contour of those portions of the article supporting surface upon which they ride while windrowing the articles.

6. An apparatus according to claim 5 wherein said rotatable windrowing means are wheel and tire assemblies.

7. An apparatus according to claim 5 wherein the article supporting surface is relatively loose soil and wherein said article advancing means of said rotatable windrowing means includes lugs angled downwardly and rearwardly relative to the direction of rotation of said rotatable windrowing means for lifting loose soil from high spots and depositing the lifted soil in low spots to flatten the soil.

8. An apparatus according to claim 5 wherein said wing means includes a main boom, wherein said independent connecting means for the semi-rigid rotatable windrowing means are pivotally connected to said boom; and additionally comprising rotary drive means rigidly secured on the outermost end of said main boom and having a drive shaft angled downwardly and rearwardly, an inner brush secured to said shaft, a ground engaging depth control disc and means for connecting said depth control disc connected to said shaft for rotation therewith and for universal movement relative thereto for controlling the elevation of the outermost end of the boom.

9. An apparatus according to claim 8 and additionally comprising rotary outer brush means, a brush boom pivotally connecting said brush means to the outer end of said main boom for pivotal movement about a vertical axis, brush drive means including a downwardly and rearwardly projecting brush drive shaft for rotating said brush means, means rigidly connecting said brush means to said brush drive shaft, a depth control disc, and means coupling said depth control disc to said brush shaft for rotation therewith and for universal movement relative thereto.

10. An apparatus according to claim 9 including resilient means for urging said outer brush means outwardly, said resilient means being connected to said brush boom, and deflecting means connected to said outer brush means and projecting forwardly and inwardly for engaging obstructions in the path of movement of said outer brush means for deflecting said outer brush means a safe distance inwardly of the obstruction until said outer brush means moves safely past the obstruction.

11. A rotary windrowing machine for windrowing fruit or the like from the soil between two rows of trees comprising: a mobile vehicle having a chassis movable over the soil along a path substantially parallel to and midway between the tree rows, first power means connected to said vehicle for moving said vehicle along said path, means defining a pair of wings pivotally mounted on said vehicle for horizontal and vertical movement, one of said wings being on one side of said vehicle and the other wing being on the other side of said vehicle, second power means connected between said wings and said vehicle for horizontally pivoting said wings between a stowed position parallel to the longitudinal axis of the vehicle and any one of a plurality of outwardly and forwardly diverging windrowing positions for windrowing fruit between tree row spacings or different widths, a pair of third power means for independently raising or lowering said wings, each of said third power means being connected between said vehicle and a corresponding one of said wings, a plurality of rigid or semi-rigid rotatable windrowing means for each wing with each windrowing means having a lower face adapted to rest on the soil and a generally upright cylindrical periphery having a fruit advancing means thereon for progressively moving the fruit inward from the outer windrowing means of both wings to the inner windrowing means, drive means including generally vertical shafts for rotating each of said windrowing means, universal joint means coupling each of said windrowing means to a corresponding vertical shaft for universal movement, and means independently connecting different ones of said plurality of drive means to each of said wing defining means for allowing the rotatable windrowing means to independently follow the contour of the soil upon which they ride while windrowing fruit.

12. An apparatus according to claim 12 wherein said fruit advancing means of each of said rotary windrowing means includes lugs angled downwardly and forwardly relative to the direction of rotation of said rotatable windrowing means for lifting loose soil from high spots and depositing the lifted soil in low spots to flatten the soil.

13. An apparatus according to claim 11 wherein each of said wing means includes a main boom, wherein said independent connecting means for the semi-rigid rotatable windrowing means are pivotally connected to said associated boom; and additionally comprising rotary drive means rigidly secured on the outermost end of said main boom and having a driven shaft angled downwardly and rearwardly, an inner brush secured to said shaft, a ground engaging depth control disc connected to said shaft for rotation therewith and for universal movement relatve thereto for controlling the elevation of the outermost end of the boom.

14. An apparatus according to claim 13 wherein each of said wings additionally comprises outer rotary brush means, a brush boom pivotally connecting said outer brush means to the outer end of said main boom for pivotal movement about a vertical axis, outer brush drive means including a downwardly and rearwardly projecting brush drive shaft for rotating said outer brush means, means rigidly connecting said outer brush means to said outer brush drive shaft, a depth control disc and means coupling said depth control disc to said outer brush shaft for rotation therewith and for universal movement relative thereto.

15. An apparatus according to claim 14 including resilient means for urging said outer brush means outwardly, said resilient means being mounted to said brush boom, and deflecting means connected to said outer brush and projecting forwardly and inwardly for engaging obstructions in the path of movement of said outer brush means and for deflecting said outer brush means a safe distance inwardly until said outer brush means moves safely past the obstruction.

16. An apparatus according to claim 14 wherein said outer and inner brush drive means and said wheel drive means are all separate drive means which may be adjusted to drive the associated brushes and rotatable windrowing means at different speeds.

17. A machine for windrowing articles on an article supporting surface which may vary in contour comprising: a chassis movable over the article supporting surface, a pair of booms connected to said chassis and arranged to project laterally therefrom at opposite sides thereof, a plurality of rotatable windrowing means mounted in generally aligned and spaced relationship on each of said booms, each of said windrowing means having a generally continuous outer peripheral surface adapted to engage said articles and move said articles inwardly toward said chassis, drive means for continuously rotating each of said rotatable windrowing means about a generally vertical axis, and universal joint means independently connecting said drive means to each of said windrowing means for allowing each of said windrowing means to freely pivot in all directions relative to the supporting surface to thereby independently adjust to the contour of the supporting surface.

18. A machine according to claim 17 wherein each of said rotatable windrowing means includes a wheel and tire assembly.

19. A machine according to claim 18 wherein each of the tires in said assemblies includes projecting tread extending outwardly from the peripheral surface of the tire and being angled downwardly and forwardly relative to the direction of rotation or said tire.

20. A machine according to claim 17 including means for independently connecting each of said windrowing means to said booms for independent vertical movement relative to said booms.

* * * * *

UNITED STATES PATENT OFFICE
CERTIFICATE OF CORRECTION

PATENT NO. : 3,961,469
DATED : June 8, 1976
INVENTOR(S) : LEON R. MC ROBERT

It is certified that error appears in the above-identified patent and that said Letters Patent are hereby corrected as shown below:

Column 2, line 16 after "sturdy" add --and accordingly will not ride over loose rocks and large clods but will windrow them along with the fruit--.

Column 9, line 59 after "of" change "side" to --said--.

Column 11, line 36 change "or" to --of--.

Column 11, line 56 change "12" (second occurrence) to --11--.

Signed and Sealed this

Twenty-first Day of December 1976

[SEAL]

Attest:

RUTH C. MASON
Attesting Officer

C. MARSHALL DANN
Commissioner of Patents and Trademarks